United States Patent [19]

Donald et al.

[11] Patent Number: 4,805,237
[45] Date of Patent: Feb. 14, 1989

[54] PARAMETRIC DIODE AMPLIFIER

[75] Inventors: David K. Donald, Mountain View; Shih-Yuan Wang; Tirumala R. Ranganath, both of Palo Alto; Steven A. Newton, Belmont; William R. Trutna, Atherton; David M. Bloom, Menlo Park; Frank K. David, Santa Rosa, all of Calif.

[73] Assignee: Hewlett-Packard Company, Palo Alto, Calif.

[21] Appl. No.: 191,729

[22] Filed: May 10, 1988

Related U.S. Application Data

[63] Continuation of Ser. No. 720,821, Apr. 8, 1985, abandoned.

[51] Int. Cl.$^4$ .............................................. H04B 9/00
[52] U.S. Cl. ............................ 455/619; 250/214 AG; 330/4.9
[58] Field of Search .................. 455/619; 250/214 R, 250/214 A, 214 AG, 214 C, 211 J; 307/311; 330/4.9

[56] References Cited

U.S. PATENT DOCUMENTS

| 4,020,341 | 4/1977 | Javan | 250/211 J |
| 4,156,135 | 5/1979 | Miller, Jr. et al. | 455/619 |
| 4,307,294 | 12/1981 | Campbell | 455/619 |

OTHER PUBLICATIONS

Drucheuskii et al.-"Extension of Dynamic Range"-Instrum. & Exp Tech (USA), vol. 23, No. 3, Pt 2-May--Jun. 1980-Published Dec. 1980-pp. 758-760.
Davis-"Optical and Electronic Mixing"-Electronics Letters, Jan. 22, 1970, vol. 6, No. 2, pp. 25, 26.
W. D. Gill et al., Photovoltaic Properties of $Cu_2S$-CdS Heterojunctions, Journal of Applied Physics, vol. 41, No. 9, Aug. 1970.
G. Lubberts, et al., Photodetection by Light Induced Barrier Modulation in Cu-Diffused Au-CdS Diodes, Jour. of Appl. Phys., vol. 45, No. 5, May 1974.
Hall, J. L. and Morey, W. W., Optical Heterodyne Measurement of Neon Laser's Millimeter Wave Difference Frequency, Applied Physics Letters, vol. 10, No. 5, Mar. 1, 1967, pp. 152-155.
Wang, Shih-Yuan, Ultra-High-speed Photodiode, Laser Focus/Electro-Optics, vol. 19, Dec. 1983, pp. 99-106.

*Primary Examiner*—Benedict V. Safourek
*Assistant Examiner*—Andrew J. Telesz, Jr.
*Attorney, Agent, or Firm*—John A. Frazzini

[57] ABSTRACT

A parametric photodiode amplifier suitable for detecting light of frequency f and intensity P and having intersecting I:V curves for zero incident light and for incident light of intensity P. These photodiodes typically have an intrinsic density of carriers that is on the order of or less than the density of carriers produced by incident light of intensity P. When the photodiode is biased by an LO signal and is illuminated with modulated light of carrier frequency f, the photodiode output signal contains IF components at the difference between the frequencies of the modulation signal and the frequencies of on the order of the 23 lower harmonics of the LO signal.

8 Claims, 5 Drawing Sheets

PARAMETRIC DIODE AMPLIFIER

This application is a continuation of application Ser. No. 720,821 filed Apr. 8, 1985 now abandoned.

BACKGROUND OF THE INVENTION

This invention relates in general to parametric amplifiers and in particular to a photodiode amplifier suitable for use in detecting and heterodyning modulated light waves. Just as a radio wave carrier signal can be modulated to carry information, a light signal of frequency f can be utilized as a carrier that is modulated to carry information. Such modulated light signals can be utilized in laboratory experiments and can also be utilized to transmit data, for example, in optical fibers. In order to have high data rates, the optical carrier needs to be modulated at correspondingly high frequencies m. Often, these laboratory experiments give rise to frequencies m higher than can be amplified by conventional amplifiers so that it is necessary to heterodyne the modulation frequency down to an intermediate frequency (IF) that can be adequately amplified by conventional amplifiers.

In the most common present technique of detecting an heterodyning the modulation signal down to intermediate frequencies, the modulated light signal is detected by a photodiode to produce a photodiode signal proportional to the intensity of the light. For an amplitude modulated light signal, the photodiode signal is proportional to the modulation signal. This photodiode signal is sent to a separate mixer where the modulation signal is heterodyned to intermediate frequencies. The output of the mixer is connected to a conventional amplifier to amplify the output signal.

For modulation signals up to about 32 GigaHertz (GHz), the photodiode signal can be carried by coaxial cable. However, above 32 GigaHertz, it is necessary to utilize waveguides to carry the photodiode signal. Unfortunately, there is a rule of thumb that a given waveguide has a roughly flat transfer characteristic only over one octave (i.e., a 2:1 range of frequencies). Therefore, if the range of frequencies of interest is larger than one octave, then it is necessary to switch between waveguides utilized to carry the photodiode signal. Since the photodiode is typically built into the waveguide, this means replacing the photodiode as well as the waveguide. This makes it clumsy to perform experiments in which the modulation frequency is varied over more than one octave of frequencies above 32 GHz. The use of different waveguides and photodiodes in the various octaves also introduces some variations into the measurements. It would therefore by useful to have a scheme that enables more than one octave to be utilized above 32 GHz without necessitating interchanging waveguides and photodiodes.

In a technique presented by J. L. Hall and W. W. Morey in an article "Optical Heterodyne Measurement Of Neon Laser's Millimeter Wave Difference Frequency", *Applied Physics Letters*, Vol. 10, No. 5, Mar. 1, 1967, p. 152, the detection and heterodyning are both performed by a "hot carrier diode" that is photosensitive even though it was not designed to function as a photodiode. In that technique, the photosensitive diode is biased by a local oscillator (LO) signal so that the resulting photodiode signal has components at the intermediate frequencies that are equal to the difference between the frequencies of the modulation signal and the frequency of the LO signal. In that approach, the photodiode is strongly reverse biased into the multiplying region of the photodiode I:V curve where the reverse current becomes a strong function of voltage. This strong oscillating reverse bias varies the capacitance of the photosensitive diode so that it operates as a parametric amplifier. Unfortunately, this technique has a very poor efficiency—the incident light from a 1.5 MilliWatt laser produced only a $10^{-14}$ Watt output signal in which the signal to noise ratio is poor.

SUMMARY OF THE INVENTION

In accordance with the illustrated preferred embodiment, a parametric photodiode amplifier is presented that is particularly useful for detecting the modulation signal carried by modulated light over a wide range of radio frequency (RF) modulation frequencies both above and below 32 GHz. It has been found that, for the photodiode presented by S. Y. Wang in the article "Ultra-High-Speed Photodiode" in *Laser Focus/Electro-Optics*, December 1983, p. 99, the I:V curve for strongly absorbed, very high intensity incident modulated light intersects the I:V curve for zero intensity incident light. The light is strongly absorbed because it has a high enough energy that it can produce electron hole pairs. Such light is referred to as bandgap light.

When this photodiode is biased by a LO signal that has excursions above and below the voltage at which the I:V curves intersect and is exposed to modulated light of very high light intensity, then a photodiode signal is produced that has surprisingly strong components at intermediate frequencies (IF) equal to the difference between the RF frequencies of the modulation signal and harmonics of the LO signal. It is also found that harmonics at surprisingly high orders produce some of the strong IF components. This photodiode is therefore especially suitable for detecting and heterodyning the modulation signal of a modulated light signal.

Isolation of the RF modulation signal from the resulting photodiode signal is achieved at those moments that the LO bias signal equals the voltage at which the I:V curves for very high intensity and for zero intensity intersect. When biased at the voltage of the cross-over point, there is no change in photodiode current associated with a change in light intensity. Therefore, the RF modulation frequencies are removed from the photodiode signal. This strong null at the cross-over point also produces a phase inversion of the photodiode signal as the bias signal sweeps through the voltage at which cross-over occurs. Such a phase reversal contributes to a strong heterodyne response of the photodiode to the LO and RF signals.

The incident light is focussed to the smallest size that the source of light allows and the photodiode is selected to have an area substantially equal to the area of the focussed light. This is done to minimize the junction and parasitic capacitances that put an upper limit on the RF frequencies that can be detected. This is also done to keep the effects that produce the cross-over in the I:V curves from being swamped by other effects such as the resistance and capacitance associated with unexposed portions of the photodiode.

The I:V curves for a range of light intensities were investigated to determine the cause of the cross-over. It was observed that for large forward or for large reverse bias the curve for high intensity is substantially parallel to the curve for zero intensity. This means that the cross-over is not caused by a change in conductivity associated with the higher intensity of light since a change in conductivity would tilt one curve relative to the other and thereby prevent them from being asymptotically parallel. Instead, the curve for very high light intensity has a similar shape as that for zero intensity, and is translated somewhat in the directions of both the I and V axes. For the light intensities typically used ($<1$ Watt/cm$^2$), the resulting photocurrent merely adds to the current otherwise developed across the diode junction by an applied voltage. Thus, the I:V curves for low light intensities have a similar shape but are shifted relative to one another by a translation in the direction of the I axis. Therefore, for these diodes, the application of very high intensity light (on the order of 1 KiloWatt/cm$^2$) produces a translation in the direction of the V axis in addition to the translation in the direction of the I axis already exhibited by low intensity light. This means that the very high intensity light is producing a photovotaic effect that is not observed at lower intensities.

Further analysis of this effect indicates that the photovoltaic effect will appear when the number of carriers produced by the incident light is comparable to or larger than the number of carriers produced by intrinsic carrier generation and by dopant and impurity carrier generation for that diode. Therefore, the photodiodes that are suitable for use as high frequency detector/heterodyne action should be relatively small and have relatively high purity and low dopant levels compared to most photodiodes.

DESCRIPTION OF THE FIGURES

In the Figures, the first digit of a reference numeral indicates the first figure in which that element is shown.

DESCRIPTION OF THE PREFERRED EMBODIMENT

Figure 1:
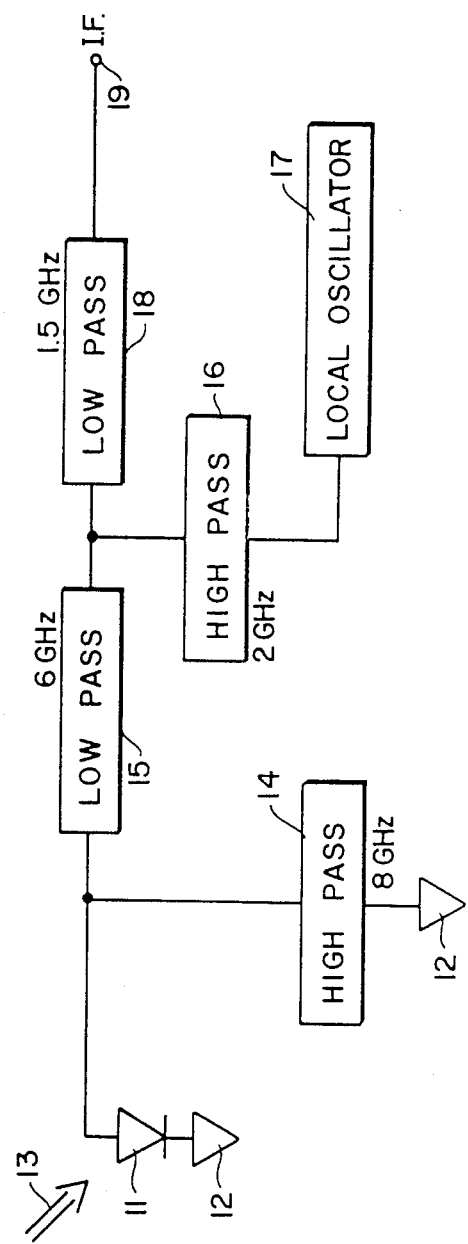
FIG. 1 is a block diagram of a parametric photodiode amplifier in accordance with the preferred embodiment of the disclosed invention.
Figure 2A:
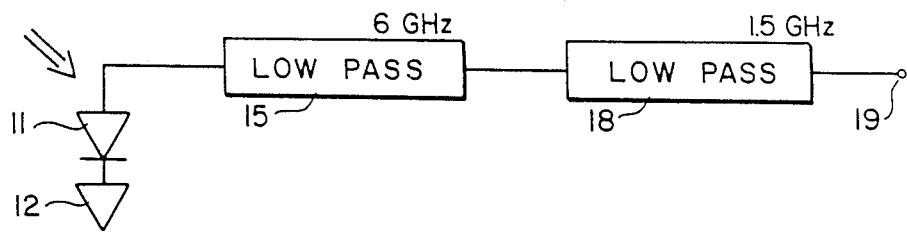
FIGS. 2A–2C show the portions of the block diagram of FIG. 1 corresponding to the IF, LO and RF loops.
Figure 2B:
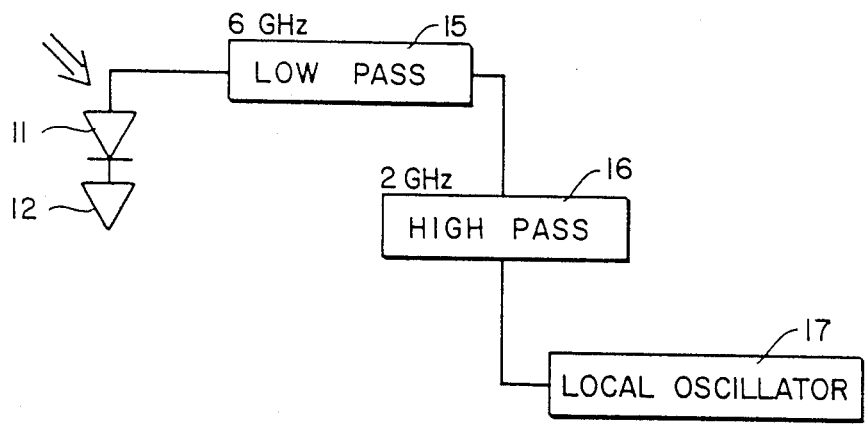
Figure 2C:
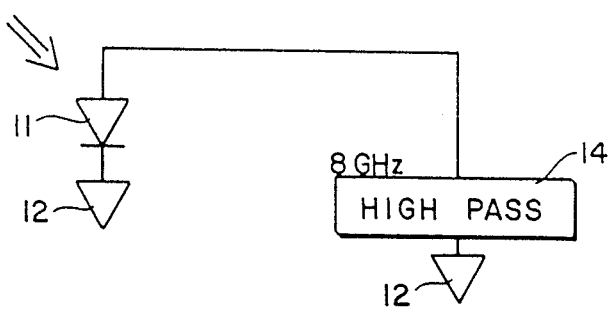

In FIG. 1 is a block diagram of a circuit suitable for detecting light modulated at RF frequencies and heterodyning the light down to intermediate frequencies. A photodiode 11 of the type presented in the article "Ultra-High-Speed Photodiode", *Laser Focus/Electro-Optics*, December 1983, p. 99 by S. Y. Wang, has a first lead connected to ground 12 and is exposed to very high intensity light modulated at RF frequencies. A second lead of the photodiode is connected through an 8 GHz high pass filter 14 to ground. This portion of the circuit (shown separately in FIG. 2C, provides a path for the RF modulation frequencies. The second lead is also connected in series through a 6 GHz low pass filter 15 and a 2 GHz high pass filter 16 to a local oscillator 17. This portion of the circuit (shown separately in FIG. 2B) provides a path for a local oscillator (LO) signal to provide a bias across the photodiode. The second lead is also connected through low pass filter 15 and a 1.5 GHz low pass filter 18 to produce at an output 19 an output signal having intermediate frequencies (IF).

Figure 3:
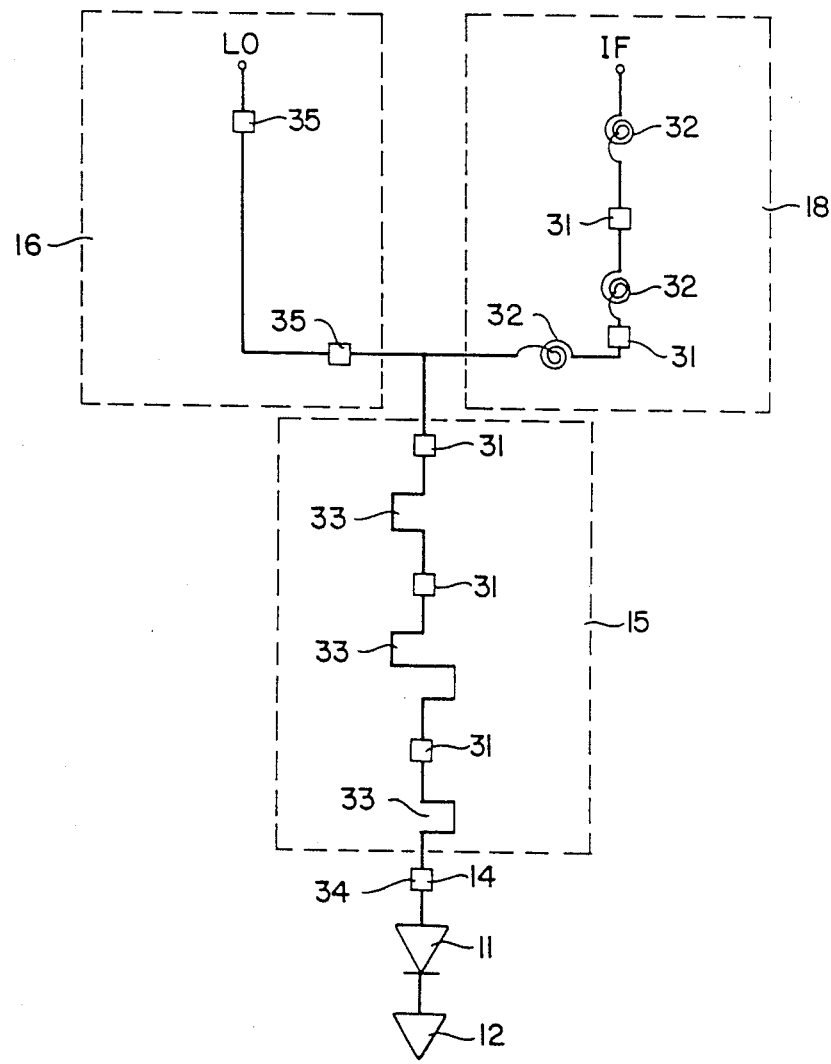
FIG. 3 shows an embodiment corresponding to the block diagram of FIG. 1.

The actual embodiment of the circuit illustrated in FIG. 1 is shown in FIG. 3. That circuit is manufactured as a metallized pattern formed on top of an insulator that separates the metallized pattern from a ground plane. The metallized pattern includes sections that form capacitors and inductors. The capacitors are formed either: as a set of square plates 31 of metal that are capacitively coupled to the ground plane; as a small chip capacitor 34; or as small chip capacitors 35 in series with the LO signal line. A set of spirals 32 and a set of half loops 33 function as inductors. The capacitive plates have areas on the order of 20 square millimeters, the spirals have a diameter on the order of 2 millimeters, and the half loops have a lateral dimension on the order of 1 millimeter. These choices operate to produce the high and low pass filters shown in FIGS. 1 and 2.

Figure 4:
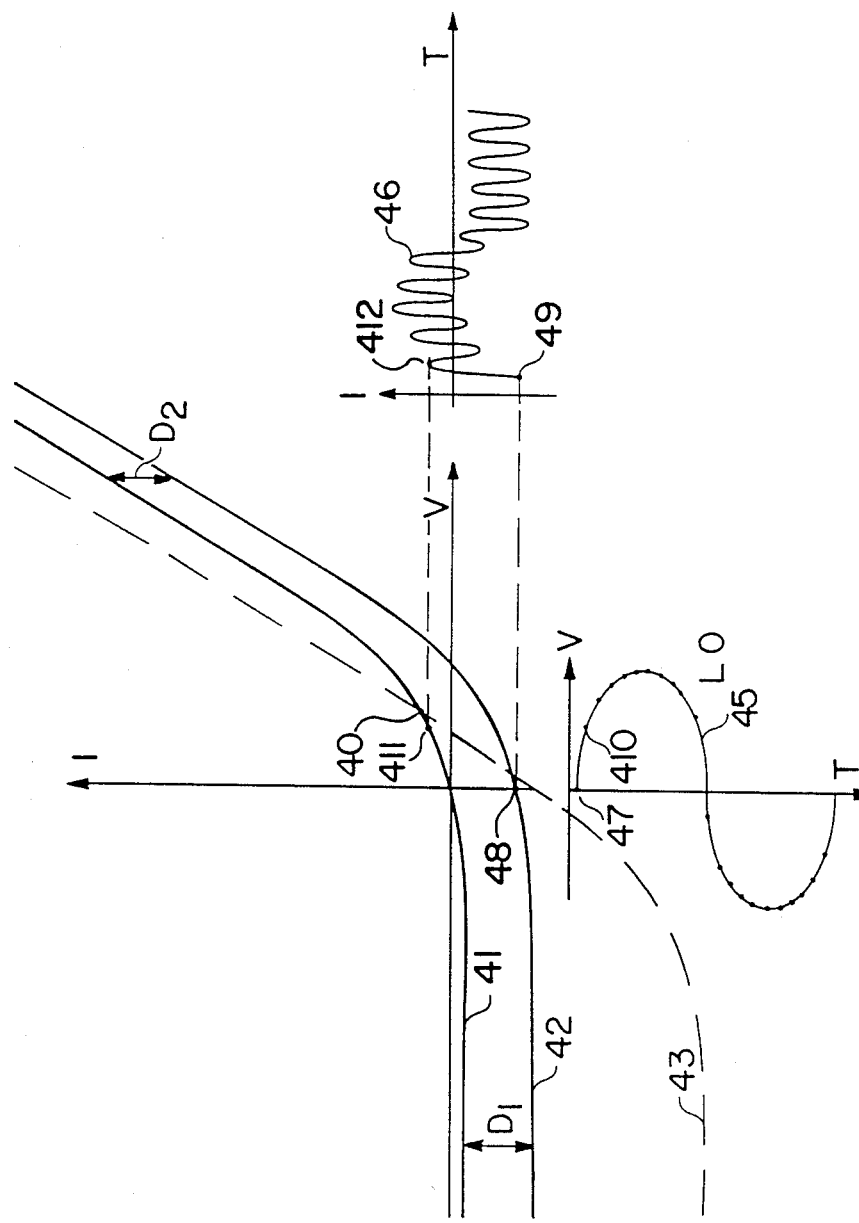
FIG. 4 illustrates the production of a photodiode output signal in response to an LO bias signal and low intensity incident RF modulated light.
Figure 5:
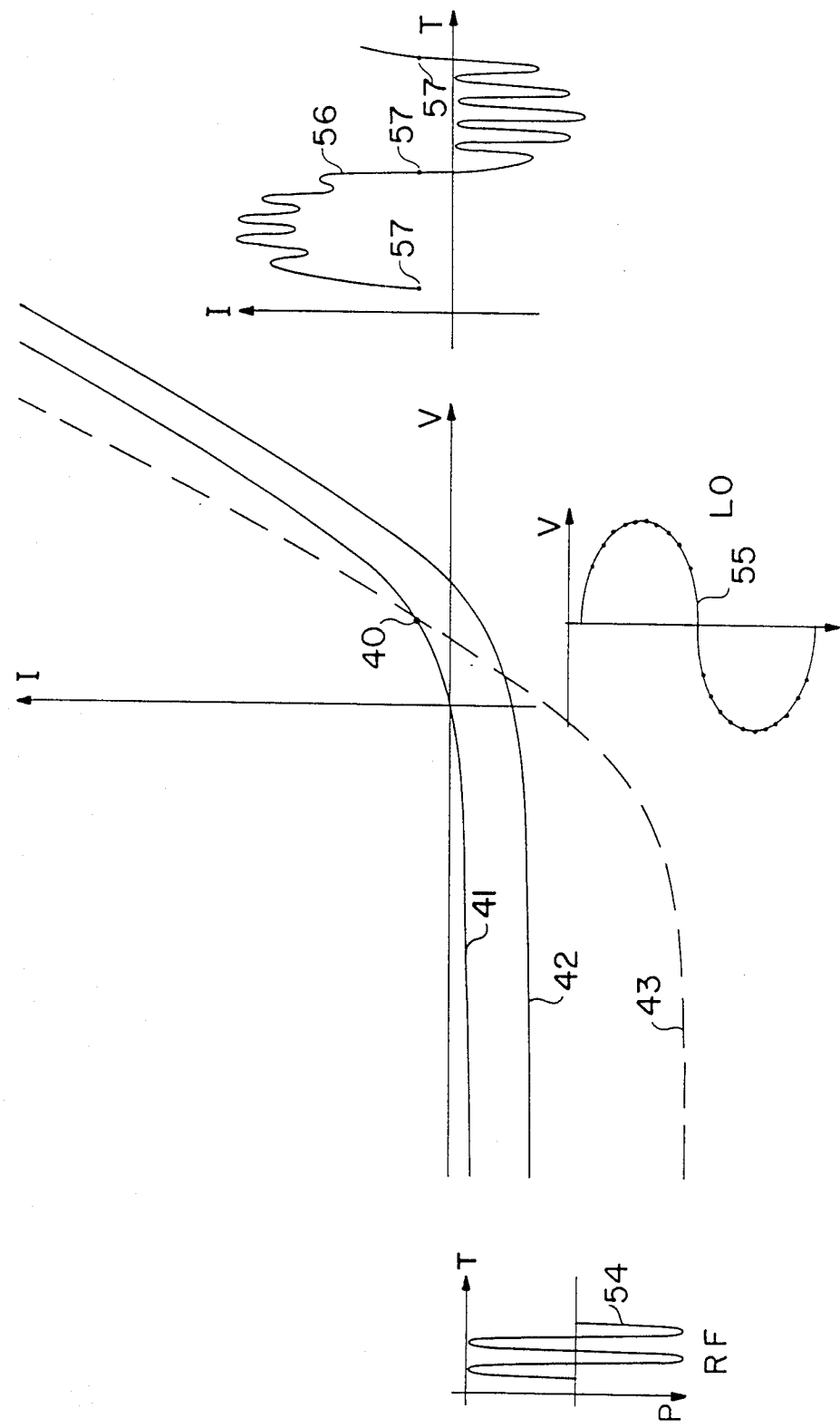
FIG. 5 illustrates the production of a photodiode output signal in response to an LO bias signal and very high intensity incident RF modulated light.

FIGS. 4 and 5 illustrate the operation of the circuit shown in FIG. 3. When no light is incident on photodiode 11, a curve 41 of current as a function of voltage results. When a low or moderate level of light intensity is incident on the photodiode, I:V curve 42 results and, when a very high intensity of light is incident on the photodiode, I:V curve 43 results. For low intensity light, the light produces electron/hole pairs that are driven in opposite directions by the electric field in the junction of the photodiode. This produces a photocurrent that is proportional to the incident light intensity. The photocurrent is a minority carrier current that adds to the intrinsic minority carrier current comprising the reverse bias saturation current $I_o$ of the diode. The effect of this is that curve 42 is substantially just curve 41 translated by the amount of the photocurrent. Curves 41 and 42 are substantially asymptotically parallel so that distance $D_1$ is substantially equal to distance $D_2$. In actuality, the inherent resistance in the photodiode makes curves 41 and 42 approach slowly in the forward bas region. Curve 43 is likewise substantially congruent to curve 41 but is translated in both the I and V axis directions. This indicates that very high light intensities produces a photovoltaic effect that translates the I:V curve in the V direction in addition to the translation in the I direction.

The effect of the photodiode on low or moderate intensity modulated light is illustrated in FIG. 4. In that illustration, it is assumed that there is 100% modulation of the signal (i.e., the light intensity varies between zero and some maximum). The intensity P of the light as a function of time T is shown as curve 44. In FIG. 4, the dc bias is assumed to be zero so that the LO bias signal (shown as a function of time as curve 45) oscillates symmetrically about zero voltage. The combination of the LO bias signal and the modulated light produce an output signal shown as curve 46. Curve 46 is produced by correlating the light intensity curves and the LO voltage at equal times against the I:V curves. For example, at a time of peak intensity (indicated as point 47 on curves 44 and 45), curve 42 of peak intensity is to be used. Point 48 on curve 42 represents the bias and intensity conditions at time 47 and produces point 49 on output curve 46. Likewise, at point 410 on curves 44 and 45, the light intensity is zero so that curve 41 is to be used at that point. This produces an output signal point 412 on curve 46. The same type of analysis is utilized in FIG. 5 for the case of very intense incident light. The photodiode output current 56 is the result of the application of the very intense incident light 54 and the LO bias signal 55.

Because the distance between curves 41 and 42 is substantially independent of bias point, curve 46 is substantially a linear function of both curve 44 and curve 45. Because a strong heterodyne action requires a nonlinear circuit element, at low light intensities a photodiode exhibits only a very small heterodyne action. In contrast to this, a very high light intensity produces a photodiode output signal that is a strong nonlinear function of the incident light intensity P and the bias voltage. This results in a strong heterodyne effect that produces much stronger IF frequencies in the photodiode output signal than is produced when light of low or moderate intensity is used. This nonlinearity also increases the effect of higher order harmonics of the LO signal than for low or moderate intensity light.

Because at the cross-over point 40 the photodiode signal intensity is independent of the light intensity P, there is a phase inversion at points 57 of curve 56 that correspond to bias voltages equal to the voltage of the cross-over point. This phase inversion further contributes to the non-linearity of the response of the photodiode, thereby enhancing the heterdyne action.

The detector/heterodyne circuit of FIG. 1 has been utilized to produce an intermediate frequency of 0.321 GHz for RF modulation signals in the range from 0.1-80 GHz and for the LO bias voltage in the range of 2-6 GHz. Under certain conditions for powers greater than $10^{-8}$ Watts generated by the device, the output signal is actually larger than the input signal. This amplification contrasts strongly to the weak signal generated by Hall and Morey in the article discussed in the Background of the Invention. Harmonics up to the 23rd harmonic of the local oscillator have been shown to be effective in producing the IF signals in the photodiode output signal.

The amplifier of FIG. 1 can be utilized as a RF current detector by a different choice of frequencies than when it is used to detect RF modulation of a light carrier. In order to serve as a RF current detector, the light is modulated at a low frequency in response to a local oscillator and the local oscillator of FIG. 1 is replace by the source of RF current to be detected. The circuit of FIG. 1 can also be easily converted to a pure amplifier instead of a detector/heterodyne circuit. To do this, the local oscillator 17 is replaced by a dc voltage source that forward biases the photodiode at a voltage greater than the voltage of the cross-over point. The distance in the I direction between curves 41 and 43 to the right of the cross-over point is typically greater than between curves 41 and 42 so that an amplified photodiode output signal will result.

Although the examples in FIGS. 4 and 5 are for amplitude modulated light, the parametric photodiode amplifier can also be used to detect and heterodyne frequency modulated light. In the case of frequency modulated light, the photodiode is illuminated by an additional reference beam of light having substantially the same frequency and intensity as the carrier frequency of the frequency modulated light. These two beams interfere to produce an amplitude modulated signal with modulation proportional to the modulation of the frequency modulated signal. In both the frequency and amplitude modulated cases, the carrier frequency should be such that the light has sufficient energy to produce large numbers of electron/hole pairs.

By the term "very intense light" is meant incident light that is sufficiently strong to induce the photovoltaic effect discussed above that shifts the I:V curve in the direction of the V axis. In general, this requires that the intensity be strong enough that the number of carriers in the region illuminated by the light is on the order of the number of carrier produced by thermal agitation, dopants and impurities. That this is the case can be seen as follows. To produce a photovoltaic effect, the light must be strong enough to affect significantly the electrochemical macropotential. In an equilibrium condition, the electrochemical macropotential is equal to the Fermi energy $E_F$. For a semiconductor with an equal number of holes and conduction band electrons, the Fermi energy level is in the middle of the gap between the conduction and valence bands, but for n and p type materials, the Fermi level is closer to the conduction and valence bands, respectively. Since incident light produces equal numbers of holes and free electrons, the incident light tends to push the electrochemical macropotential toward the middle of the gap between the conduction and valence bands. For there to be a significant shift, the number of photogenerated carriers must be comparable to the number of non-photogenerated carriers, thereby establishing the criterion indicated above.

For the 1-2 KW/cm$^2$ light used in the disclosed parametric photodiode amplifier, this requires that the total number of carriers from all sources other than the incident light be on the order of or less than $10^{16}$/cc. In general, this means that the photodiode must be produced by a clean process such as molecular beam epitaxy (MBE) or organo-metallic vapor phase epitaxy (OMVPE) but should probably not be produced by a process such as liquid phase exitaxy (LPE) that at the present state of technology, incorporates a higher percentage of impurities than does MBE or OMVPE. At very low impurity levels (less than about $10^{11}$/cc) the photovoltaic effect will tend to be swamped by other effects such as series resistance that influence the diode junction's behavior. The area of the photodiode should be comparable to the area of the imaged beam of incident light. For the amplifier shown in FIG. 3, the light is imaged to a 10 micron diameter spot. Photodiodes having diameters ranging from 5 to 80 microns have been shown to exhibit crossing I:V curves for a light intensity on the order of 1 KW/cm$^2$.

We claim:

1. A photodetector for amplifying a carrier light signal of peak intensity P and carrier frequency f, said photodetector comprising:

a photodiode having a gap between its conduction and valence bands such that light of frequency f has sufficient energy to produce electron hole pairs, having a density D of photogenerated carriers when exposed to light of carrier frequency f and peak intensity P, and having a density d of non-photogenerated carriers;

means for exposing a surface of said photodiode with light of carrier frequency f and of peak intensity P sufficiently large that the density D of photogenerated carriers in the region adjacent to said surface of the photodiode is on the order of or greater than the density d of nonphotogenerated carriers so that the curve of current versus voltage for the photodiode with no incident light intensity crosses, at a point O of voltage $V_q$ and current $I_q$, over the curve of current versus voltage for the photodiode when incident light of intensity P and carrier frequency f is incident on said surface of the photodiode; and, means for biasing the photodiode with a bias signal that at least part of the time is greater than the voltage $V_q$ of point O.

2. A photodetector as in claim 1 suitable for use in detecting and heterodyning a modulated light carrier signal, wherein said bias signal comprises a constant offset component of amplitude A and a sinusoidal component of frequency f' and amplitude A', where $A+A'$ is greater than $V_q$, and wherein said light of carrier frequency f and peak intensity P is modulated.

3. A photodetector as in claim 2 wherein a local oscillator produces an average forward bias on the photodiode.

4. A photodetector as in claim 3 wherein the amplitude A of the constant offset component of the bias signal is equal to $V_q$, whereby the output signal is isolated from the frequency f of the carrier signal.

5. A photodetector as in claim 2 wherein said modulated light carrier is phase modulated, said photodetector further comprising:

second means for exposing said photodiode surface with light of frequency f' that is substantially equal to f, whereby this light interferes with the light of frequency f to produce at said surface light that has a modulated amplitude.

6. A photodetector as in claim 1 wherein the photodiode has a density of non-photogenerated carriers less than 3 times $10^{16}$/cc and the intensity P is at least 1 KW/cm$^2$.

7. A photodetector as in claim 1 suitable for detecting an RF signal, wherein:

said light of carrier frequency f and peak intensity P has an intensity that is modulated by a local oscillator signal; and wherein said bias signal includes an AC component proportional to said RF signal.

8. A photodetector as in claim 1 wherein said bias signal is a DC signal of voltage greater than $V_q$, whereby said photodetector is an amplifier.

* * * * *